US010021152B2

(12) United States Patent
Lohe

(10) Patent No.: US 10,021,152 B2
(45) Date of Patent: Jul. 10, 2018

(54) SHARING LOCATION INFORMATION FOR LOCATIONS ACCESSED DURING A CONFERENCE

(71) Applicant: AT&T Intellectual Property I, L.P., Atlanta, GA (US)

(72) Inventor: Sachin Lohe, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 218 days.

(21) Appl. No.: 14/614,717

(22) Filed: Feb. 5, 2015

(65) Prior Publication Data
US 2016/0234265 A1    Aug. 11, 2016

(51) Int. Cl.
H04L 29/06    (2006.01)
H04L 12/58    (2006.01)
H04L 12/18    (2006.01)

(52) U.S. Cl.
CPC ........ *H04L 65/403* (2013.01); *H04L 12/1822* (2013.01); *H04L 51/20* (2013.01)

(58) Field of Classification Search
CPC ................................................... H04L 65/403
See application file for complete search history.

(56) References Cited

U.S. PATENT DOCUMENTS

| 5,339,392 A * | 8/1994 | Risberg | G06F 3/0481 715/255 |
| 6,418,214 B1 * | 7/2002 | Smythe | H04M 3/56 379/202.01 |
| 7,149,776 B1 * | 12/2006 | Roy | G06F 17/30873 709/205 |
| 7,624,188 B2 * | 11/2009 | Koskelainen | H04L 12/1827 370/260 |
| 7,660,587 B2 * | 2/2010 | Nurminen | H04M 7/003 379/221.11 |
| 8,000,466 B2 | 8/2011 | Caspi et al. | |
| 8,260,854 B2 | 9/2012 | Cockerton | |
| 8,280,948 B1 | 10/2012 | Chen | |
| 8,312,091 B2 | 11/2012 | Horstmann et al. | |
| 8,887,063 B2 | 11/2014 | LaBine et al. | |
| 2002/0116399 A1 * | 8/2002 | Camps | G06F 17/24 |
| 2004/0008635 A1 * | 1/2004 | Nelson | H04N 7/147 370/260 |
| 2004/0148347 A1 * | 7/2004 | Appelman | H04L 29/08684 709/204 |
| 2004/0158586 A1 * | 8/2004 | Tsai | G06F 17/3089 |

(Continued)

OTHER PUBLICATIONS

Cisco, "WebEx Meeting Center User Guide," 2010.

*Primary Examiner* — Backhean Tiv
(74) *Attorney, Agent, or Firm* — Hartman & Citrin LLC

(57) ABSTRACT

Concepts and technologies are disclosed herein for providing a location sharing service. A server computer executing a location sharing service can identify a presenter for a location sharing session and a participant in the location sharing session. The server computer can receive location information from the presenter. The location information can identify a location accessed at a computing device associated with the presenter during a conference. The server computer can provide the location information to a user device associated with the participant during the conference. The server computer also can provide a log including the location information to the user device during or after the conference.

16 Claims, 11 Drawing Sheets

(56) References Cited

U.S. PATENT DOCUMENTS

| | | | |
|---|---|---|---|
| 2004/0213283 A1* | 10/2004 | Ohkubo | H04L 67/26 370/462 |
| 2005/0131871 A1* | 6/2005 | Howard | G06F 17/30067 |
| 2005/0257158 A1* | 11/2005 | Lombardo | G06F 17/2288 715/751 |
| 2006/0010392 A1 | 1/2006 | Noel et al. | |
| 2007/0011231 A1* | 1/2007 | Manion | H04L 12/1827 709/204 |
| 2008/0091778 A1* | 4/2008 | Ivashin | G06Q 10/10 709/204 |
| 2008/0239994 A1* | 10/2008 | Xiong | H04M 3/567 370/260 |
| 2008/0244419 A1* | 10/2008 | Kurpick | G06Q 10/00 715/756 |
| 2008/0263010 A1* | 10/2008 | Roychoudhuri | G06F 17/30056 |
| 2009/0006982 A1* | 1/2009 | Curtis | G06Q 10/10 715/753 |
| 2009/0132949 A1* | 5/2009 | Bosarge | G06F 17/30873 715/777 |
| 2009/0192845 A1* | 7/2009 | Gudipaty | G06Q 10/10 705/7.19 |
| 2009/0228808 A1* | 9/2009 | MacDonald | G06Q 10/10 715/756 |
| 2010/0083137 A1* | 4/2010 | Shin | H04L 12/1822 715/756 |
| 2010/0161587 A1* | 6/2010 | Sullivan | G06F 17/30884 707/709 |
| 2010/0262925 A1* | 10/2010 | Liu | G06Q 10/10 715/759 |
| 2010/0268694 A1* | 10/2010 | Denoue | G06F 17/30873 707/693 |
| 2010/0302346 A1* | 12/2010 | Huang | G06Q 10/10 348/14.09 |
| 2011/0099006 A1* | 4/2011 | Sundararaman | G10L 15/26 704/208 |
| 2011/0283008 A1 | 11/2011 | Smelyansky | |
| 2012/0236109 A1* | 9/2012 | Hsu | H04N 7/152 348/14.09 |
| 2013/0019194 A1* | 1/2013 | Vitt | G06F 8/38 715/769 |
| 2013/0103797 A1* | 4/2013 | Park | H04L 65/60 709/217 |
| 2013/0238703 A1 | 9/2013 | Desai et al. | |
| 2013/0254681 A1* | 9/2013 | DeLuca | G06F 17/30882 715/753 |
| 2013/0263021 A1* | 10/2013 | Dunn | H04L 12/1827 715/756 |
| 2013/0311906 A1* | 11/2013 | Mackin | H04L 51/32 715/758 |
| 2014/0075339 A1* | 3/2014 | Weskamp | H04L 65/403 715/753 |
| 2014/0172967 A1 | 6/2014 | Yeung et al. | |
| 2014/0226537 A1 | 8/2014 | Kashimba et al. | |
| 2014/0258416 A1* | 9/2014 | Kurupacheril | H04L 65/4023 709/205 |
| 2014/0283142 A1* | 9/2014 | Shepherd | G06F 3/0482 726/30 |
| 2015/0036807 A1* | 2/2015 | Jai | H04M 3/42221 379/88.17 |
| 2015/0304369 A1* | 10/2015 | Sandholm | G06Q 10/10 715/753 |
| 2016/0057388 A1* | 2/2016 | Rung | H04N 7/15 348/14.08 |
| 2016/0073054 A1* | 3/2016 | Balasaygun | H04N 7/15 348/14.08 |
| 2016/0234265 A1* | 8/2016 | Lohe | H04L 65/403 |
| 2016/0308939 A1* | 10/2016 | Lu | H04L 67/42 |

\* cited by examiner

SHARING LOCATION INFORMATION FOR LOCATIONS ACCESSED DURING A CONFERENCE

BACKGROUND

With the proliferation of computing devices such as personal computers, tablets, laptop computers, smartphones, and the like; people have come to rely upon various types of hardware and software to accomplish tasks in a variety of areas. For example, users may collaborate with one another, conduct meetings, conduct phone calls, join conferences, and/or otherwise collaborate during sessions. During these sessions, users may share computer screens and/or views with other users for various purposes. Data, views, and/or information shared during the collaboration session, however, may be unavailable to the participants and therefore may be lost. Thus, participants in the conference sessions may be unable to access electronic resources shared or viewed during the collaboration session.

SUMMARY

The present disclosure is directed to a location sharing service. The location sharing service can be hosted by a server computer. A computing device and a user device can communicate with the location sharing service. A conference can be setup by a presenter associated with the computing device, one or more participants associated with the user device (or user devices), and/or other entities. A host or presenter and one or more participants ("recipients") can join the conference. The presenter can elect to share locations with the participants and the participants can elect whether or not to access locations associated with location information shared by the presenter. If the presenter and at least one participant elect to use the location sharing service, the computing device can share location information with the location sharing service. In some embodiments, the computing device can generate, during the conference, a shared location stream that includes the location information and can provide the shared location stream to the location sharing service. The location sharing service can identify the participants that have elected to receive shared locations and provide the shared location information and/or shared location stream to the participants.

The participants who have elected to receive the shared location information can be provided with and/or can access the shared location stream or the location information. If the shared location stream is used to share the location information, the shared location stream can include at least one instance of location information and the user device can extract the location information from the shared location stream. In some embodiments, the user device can be configured to automatically access the location corresponding to the location information. In some other embodiments the user device can be configured to prompt a user or other entity for instructions regarding the shared location information (e.g., to store the location information, to access a location corresponding to the location information, to do nothing, or the like). In some embodiments, the user device can be configured to generate status information relating to the shared location information ("status"). The status can indicate whether or not the location information has been received, whether or not a location associated with the location information has been accessed, whether or not any errors have been experienced at the user device, combinations thereof, or the like.

The status can be provided by the user device to the location sharing service. If the computing device and/or other entities have elected to receive status updates relating to the location sharing service, the location sharing service can provide the status to those entities. The computing device can provide a location sharing service status display at the computing device or elsewhere. The location sharing service status display can indicate various status information relating to the location sharing service. Other displays can be generated for configuring the location sharing service and/or applications that can interact with the location sharing service. The displays can be presented at the computing device to configure options relating to sharing the location information and/or viewing the status. The displays also can be presented at the user device(s) to configure how shared location information is used or stored.

According to one aspect of the concepts and technologies disclosed herein, a method is disclosed. The method can include identifying, at a server computer executing a location sharing service, a presenter for a location sharing session and a participant in the location sharing session. The presenter can correspond to a first entity that shares location information. The participant can correspond to a second entity that receives the location information. The method also can include receiving, at the server computer, the location information from the presenter. The location information can identify a location accessed at a computing device associated with the presenter during a conference that includes the location sharing session. The method also can include providing, by the server computer, the location information to a user device associated with the participant during the conference and during the location sharing session.

In some embodiments, the method also can include receiving a status from the user device. The status can include information that indicates that the location information was received by the user device. In some embodiments, the status can also include information that indicates that a location associated with the location information was accessed by the user device. The method also can include transmitting, by the server computer, the status to the computing device to support presentation of a user interface at the computing device. The user interface can indicate the status.

In some embodiments, the computing device includes a processor that executes computer-executable instructions stored in a memory. Execution of the computer-executable instructions can cause the computing device to perform operations that can include detecting an access to the location at the computing device and capturing the location information. The location information can identify the location. The operations also can include transmitting the location information to the server computer, obtaining the status from the server computer, and updating the user interface based upon the status. In some embodiments, the location information can include a uniform resource locator, and in some embodiments, the location can include a website. The website can be accessed by the computing device during the conference and during the location sharing session According to another aspect of the concepts and technologies disclosed herein, a system is disclosed. The system can include a processor and a memory that stores computer-executable instructions. When the computer-executable instructions are executed by the processor, the processor can perform operations that can include identifying a presenter for a location sharing session and a participant in the location sharing session. The presenter can correspond to a first entity that shares location information and the participant can correspond to a second entity that receives the location information. The operations also can include receiving the location information from the presenter. The location information can identify a location accessed at a computing device associated with the presenter during a conference that includes the location sharing session. The operations also can include providing the location information to a user device associated with the participant during the conference and during the location sharing session.

In some embodiments, the computer-executable instructions, when executed by the processor, can cause the processor to perform operations that can further include receiving a status from the user device. The status can include information that indicates that the location information was received by the user device. In some embodiments, the status can further include information that indicates that a location associated with the location information was accessed by the user device. In some embodiments, the computer-executable instructions, when executed by the processor, can cause the processor to perform operations that can further include transmitting the status to the computing device to support presentation of a user interface at the computing device. The user interface can indicate the status.

In some embodiments, the user interface can include a conference display panel that can show content associated with the conference and a location sharing service status panel that can show the status. In some embodiments, the user interface can include information that indicates a number of shared instances of location information, a number of received instances of location information, and a number of locations accessed by the conference participants. In some embodiments, the computing device can include a processor that executes computer-executable instructions stored in a memory to perform operations. The operations can include detecting an access to the location at the computing device and capturing the location information. The location information can identify the location. The operations further can include transmitting the location information to the server computer, obtaining the status from the server computer, and updating the user interface based upon the status.

In some embodiments, the computing system can display a location sharing service options display. The location sharing service options display can include a first option to stream accessed locations to the participant, a second option to provide the user interface, and a third option to store a log of accessed locations. In some embodiments, the user device can display a conference view display and a prompt relating to the location information. The prompt can include a first option to access the location, a second option to store the location information, and a third option to ignore the shared location information.

According to yet another aspect, a computer storage medium is disclosed. The computer storage medium can have computer-executable instructions stored thereon. When the computer-executable instructions are executed by a processor, the processor can perform operations. The operations can include identifying a presenter for a location sharing session and a participant in the location sharing session. The presenter can correspond to a first entity that shares location information and the participant can correspond to a second entity that receives the location information. The operations also can include receiving the location information from the presenter. The location information can identify a location accessed at a computing device associated with the presenter during a conference that includes the location sharing session. The operations also can include providing the location information to a user device associated with the participant during the conference and during the location sharing session.

In some embodiments, the computer-executable instructions, when executed by the processor, cause the processor to perform operations that can further include receiving a status from a user device associated with the recipient. The status can include information that can indicate that the location information was received by the user device. The operations also can include transmitting the status to the computing device to support presentation of a user interface at the computing device. The user interface can indicate the status. In some embodiments, the computing device includes a processor that executes computer-executable instructions stored in a memory to perform operations that can include detecting an access to the location at the computing device, capturing the location information where the location information identifies the location, transmitting the location information to the server computer, obtaining the status from the server computer, and updating the user interface based upon the status. In some embodiments, the location information can include a uniform resource locator.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
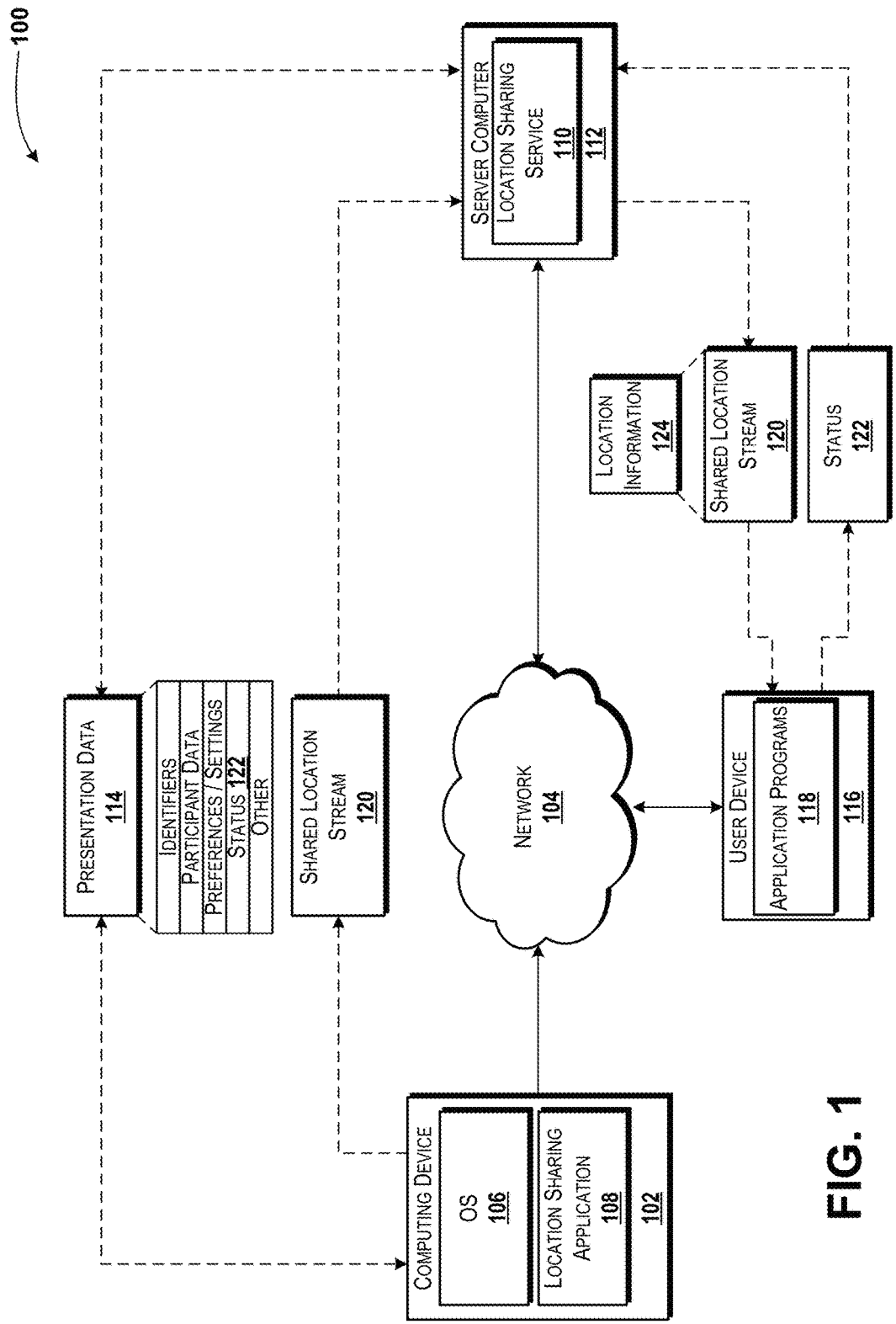
FIG. 1 is a system diagram illustrating an illustrative operating environment for various embodiments of the concepts and technologies described herein.

The following detailed description is directed to a location sharing service. A location sharing service can be hosted by a server computer. A computing device and a user device can communicate with the location sharing service. A conference can be setup by a presenter associated with the computing device, one or more participants associated with the user device (or user devices), and/or other entities. A host or presenter and one or more participants ("recipients") can join the conference. The presenter can elect to share locations with the participants and the participants can elect whether or not to access locations associated with location information shared by the presenter. If the presenter and at least one participant elect to use the location sharing service, the computing device can share location information with the location sharing service. In some embodiments, the computing device can generate, during the conference, a shared location stream that includes the location information and can provide the shared location stream to the location sharing service. The location sharing service can identify the participants that have elected to receive shared locations and provide the shared location information and/or shared location stream to the participants.

The participants who have elected to receive the shared location information can be provided with and/or can access the shared location stream or the location information. If the shared location stream is used to share the location information, the shared location stream can include at least one instance of location information and the user device can extract the location information from the shared location stream. In some embodiments, the user device can be configured to automatically access the location corresponding to the location information. In some other embodiments the user device can be configured to prompt a user or other entity for instructions regarding the shared location information (e.g., to store the location information, to access a location corresponding to the location information, to do nothing, or the like). In some embodiments, the user device can be configured to generate status information relating to the shared location information ("status"). The status can indicate whether or not the location information has been received, whether or not a location associated with the location information has been accessed, whether or not any errors have been experienced at the user device, combinations thereof, or the like.

The status can be provided by the user device to the location sharing service. If the computing device and/or other entities have elected to receive status updates relating to the location sharing service, the location sharing service can provide the status to those entities. The computing device can provide a location sharing service status display at the computing device or elsewhere. The location sharing service status display can indicate various status information relating to the location sharing service. Other displays can be generated for configuring the location sharing service and/or applications that can interact with the location sharing service. The displays can be presented at the computing device to configure options relating to sharing the location information and/or viewing the status. The displays also can be presented at the user device(s) to configure how shared location information is used or stored.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for location sharing service will be described, according to an illustrative embodiment. The operating environment 100 shown in FIG. 1 includes a computing device 102. The computing device 102 can operate in communication with and/or as a part of a communications network ("network") 104, though this is not necessarily the case. In particular, the computing device 102 can provide various aspects of the concepts and technologies described herein via direct connections with other devices if desired.

According to various embodiments, the functionality of the computing device 102 may be provided by one or more server computers, desktop computers, mobile telephones, laptop computers, set-top boxes, smartphones, tablet computers, slate computers, embedded computing devices, presentation devices, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a personal computer. It should be understood that this embodiment is illustrative, and should not be construed as being limiting in any way.

The computing device 102 can execute an operating system 106 and one or more application programs such as, for example, a location sharing application 108. The operating system 106 can include a computer program for controlling the operation of the computing device 102. The location sharing application 108 can include an executable program configured to execute on top of the operating system 106 to provide various functionality illustrated and described herein for interacting with and/or using a location sharing service.

In some embodiments, in addition to the functionality illustrated and described herein for sharing locations, the location sharing application 108 can be configured to provide functionality associated with a conferencing application. Thus, the location sharing application 108 can correspond to a conferencing application such as a member of the AT&T CONNECT family of conferencing applications from AT&T Corporation in Dallas, Tex.; a member of the WEBEX family of conferencing applications from CISCO SYSTEMS, INC. in San Jose, Calif.; a member of the GOTOMEETING conferencing applications from CITRIX SYSTEMS, INC. in Ft. Lauderdale, Fla.; other conferencing applications; combinations thereof; or the like. In some other embodiments, the location sharing application 108 may operate in conjunction, coordination, and/or cooperation with a conferencing application. Thus, the location sharing application 108 can be configured to provide conferencing services and/or to interact with conferencing applications or services, according to various embodiments of the concepts and technologies described herein.

According to various embodiments, the location sharing application 108 can be configured to interact with a location sharing service 110. The location sharing service 110 can be hosted and/or executed by a computing device such as a server computer 112. According to various embodiments of the concepts and technologies described herein, the location sharing service 110 can be configured to control and/or support sharing of locations during a conference. As such, it should be understood that the location sharing service 110 can be hosted and/or executed by a device that hosts a conferencing service or application, in some embodiments, while in some other embodiments the location sharing service 110 can be hosted and/or executed by a device that does not host or execute the conferencing service or application. In the illustrated embodiment, the location sharing service 110 can include a conferencing application or service and as such, the conference service or application is not separately illustrated in FIG. 1. It should be understood that this example is illustrative and therefore should not be construed as being limiting in any way.

The location sharing service 110 can be configured to exchange, with the computing device 102, presentation data 114. The presentation data 114 can include data that can be used to setup and/or initiate a conference such as user or device identifiers that can be used to join and/or authenticate users for a conference; preferences and/or settings associated with conferencing services and/or the location sharing service 110; status information; other information; combinations thereof, or the like. The status information can be obtained from conference participants and is explained in more detail below.

Based upon the presentation data 114, the location sharing service 110 can initiate and/or operate a conference for one or more hosts or presenters and one or more conference participants. According to various embodiments of the concepts and technologies described herein, the computing device 102 can, via execution of the location sharing application 108, participate in a conference. During the conference, the computing device 102 can access one or more locations. As used herein, a "location" can be used to refer to a website, a file, or the like. Thus, the location can correspond to a virtual location or address that, when accessed, provides a file, a document, an application, a web page, combinations thereof, or the like. In some embodiments, the "location" can correspond to a uniform resource locator ("URL"), a file location, a uniform resource indicator ("URI"), an Internet address, an IP address, an intranet location, combinations thereof, or the like. The computing device 102 can be configured, via execution of the location sharing application 108, to capture data corresponding to the location of the file, web page, document, or the like, and to share the address with the location sharing service 110.

According to various embodiments, a user device 116 can participate in a conference with the computing device 102 and/or other devices. The functionality of the user device 116 can be provided by one or more server computers, desktop computers, mobile telephones, laptop computers, set-top boxes, smartphones, tablet computers, slate computers, embedded computing devices, presentation devices, other computing systems, and the like. It should be understood that the functionality of the user device 116 can be provided by a single device, by two similar devices, and/or by two or more dissimilar devices. For purposes of describing the concepts and technologies disclosed herein, the user device 116 is described herein as a personal computer. It should be understood that this embodiment is illustrative, and should not be construed as being limiting in any way.

According to various embodiments, the user device 116 can execute one or more application programs 118. The application programs 118 can include, but are not limited to, web browsers, standalone applications, web applications, conferencing applications, combinations thereof, or the like. According to some embodiments, the application programs 118 can include a location sharing application that can be similar or even identical to the location sharing application 108 illustrated and described herein. It should be understood that this example is illustrative and therefore should not be construed as being limiting in any way.

In the illustrated embodiment, the user device 116 can join a conference and can indicate, to the location sharing service 110, that the user device 116 is to receive location information that is shared by thee conference presenter. Thus, the user device 116 can receive a shared location stream 120, which can be generated by the computing device 102 and routed to the conference participants by the location sharing service 110. It should be understood that this example is illustrative and therefore should not be construed as being limiting in any way.

As noted above, the computing device 102 can detect access to a location such as a file, a web site, a network location, combinations thereof, or the like. The computing device 102 can capture the location and stream the location to the location sharing service 110 as the shared location stream 120. The location sharing service 110 can identify conference participants that have elected to receive shared location information and stream the shared location stream 120 to the participants. Thus, for example, if the presenter associated with the computing device 102 accesses a website during a conference, the location sharing application 108 can capture the web address during the conference and stream the web address to the location sharing service 110 as the shared location stream 120.

The user device 116 also can be configured, via execution of one or more of the application programs 118, to generate status information ("status") 122. The status 122 can indicate when location information 124 included in the shared location stream 120 is received by the user device 116. The status 122 also can indicate whether or not the user device 116 accesses or otherwise uses or consumes a file, document, web site, application, or other resource corresponding to the location information 124 included in the shared location stream 120. For example, if the user device 116 accesses a file location or web address shared by the presenter, the status 122 can indicate that the user device 116 received the location information 124 and that the user device 116 accessed the a location corresponding to the location information 124. It should be understood that this example is illustrative and therefore should not be construed as being limiting in any way.

The user device 116 can provide the status 122 to the location sharing service 110. In some embodiments, the location sharing service 110 can provide the status 122 to the computing device 102 as part of the presentation data 114, if desired. In some other embodiments, the location sharing service 110 can provide the status 122 to the computing device 102 in other formats and/or as part of other data communications. The computing device 102 can be configured to generate and/or update a user interface at the computing device 102 based upon the status 122. The user interface can indicate, to the presenter or other entity, how many locations have been shared, which locations have been received, what locations have been accessed, combinations thereof, or the like.

In practice, a conference can be setup by a presenter, participants, and/or other entities. A host or presenter and one or more participants can join the conference. The presenter can elect to share locations with the participants and the participants can elect whether or not to access shared locations from the presenter. If the presenter and at least one participant elect to use the location sharing service 110, the computing device 102 can generate, during the conference, the shared location stream 120, and provide the shared location stream 120 to the location sharing service 110. The location sharing service 110 can identify the participants that have elected to receive shared locations and provide the shared location stream 120 to the participants.

The participants who have elected to receive the shared location information, e.g., the user device 116 as illustrated in FIG. 1, can be provided with and/or can access the shared location stream 120. The shared location stream 120 can include at least one instance of location information 124. The user device 116 can extract the location information 124 from the shared location stream 120. In some embodiments, as will be explained in more detail below with reference to FIGS. 2-5D, the user device 116 can be configured to access the location corresponding to the location information 124. In particular, the user device 116 can be configured to automatically access a location corresponding to the shared location information 124; to prompt a user or other entity for instructions regarding the shared location information 124 (e.g., to store the location information 124, to access a location corresponding to the location information 124, to do nothing, or the like); and/or to generate the status 122, which can indicate that the location information 124 has been received, whether or not a location associated with the location information 124 has been accessed, combinations thereof, or the like.

The status 122 can be provided by the user device 116 to the location sharing service 110. If the computing device 102 and/or other entities have elected to receive status updates relating to the location sharing service 110, the location sharing service 110 can provide the status 122 to those entities. Thus, for example, the computing device 102 can provide a location sharing service status display at the computing device 102 or elsewhere, wherein the display can indicate various status information relating to the location sharing service 110. These and other aspects of the concepts and technologies described herein for providing and interacting with a location sharing service will be illustrated and described in more detail below with reference to FIGS. 2-8.

FIG. 1 illustrates one computing device 102, one network 104, one server computer 112, and one user device 116. It should be understood, however, that various implementations of the operating environment 100 can include zero, one, or more than one computing device 102; zero, one, or more than one network 104; zero, one, or more than one server computer 112; and/or zero, one, or more than one user device 116. As such, the illustrated embodiment should be understood as being illustrative, and should not be construed as being limiting in any way.

Figure 2:
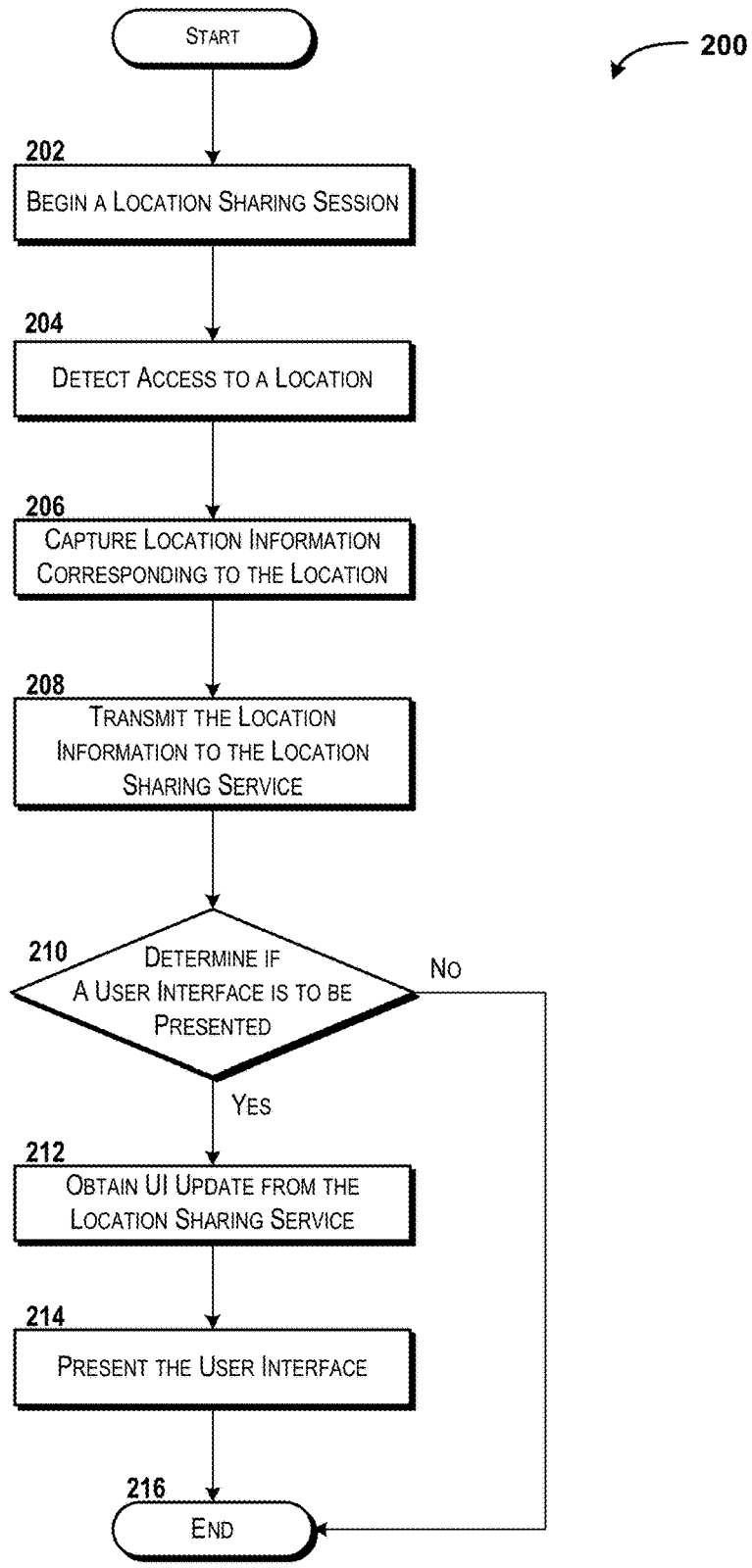
FIG. 2 is a flow diagram showing aspects of a method for sharing locations using a location sharing service, according to an illustrative embodiment of the concepts and technologies described herein.

Turning now to FIG. 2, aspects of a method 200 for sharing locations using a location sharing service 110 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device such as the computing device 102, the server computer 112, and/or the user device 116 to perform one or more operations and/or causing the processor to direct other components of the computing system or device to perform one or more of the operations.

For purposes of illustrating and describing the concepts of the present disclosure, the method 200 is described as being performed by the computing device 102 via execution of one or more software modules such as, for example, the location sharing application 108. It should be understood that additional and/or alternative devices and/or network nodes can provide the functionality described herein via execution of one or more modules, applications, and/or other software including, but not limited to, the location sharing application 108. Thus, the illustrated embodiments are illustrative, and should not be viewed as being limiting in any way.

The method 200 begins at operation 202. At operation 202, the computing device 102 can begin a location sharing session. According to various embodiments, the location sharing session can be initiated or begun during a collaboration session, during an online meeting or conference, during a remote support session, or at other times. In some embodiments, a conferencing application or service can include a location sharing service and as such, initiation of a conference session, collaboration session, remote access, or the like can also initiate a location sharing session.

In some other embodiments, the location sharing session can be initiated separately from initiation of a conference session, collaboration session, remote access session, or the like. For example, a conferencing application can include an option to share locations with conference participants. Upon selection of the option, the location sharing session can be initiated and/or configured. Because the location sharing session can be initiated in additional and/or alternative ways, it should be understood that these examples are illustrative and therefore should not be construed as being limiting in any way.

From operation 202, the method 200 proceeds to operation 204. At operation 204, the computing device 102 can detect an access to a location at the computing device 102.

Thus, for example, the computing device 102 can detect access to a website, a file, a document, a web location, or the like. In some embodiments, the location sharing application 108 can correspond to a web plugin or application that can detect loading or rendering of a webpage, access to a file, access to a location, combinations thereof, or the like. Thus, in operation 204, the computing device 102 can determine that a location has been accessed during the location sharing session.

From operation 204, the method 200 proceeds to operation 206. At operation 206, the computing device 102 can capture location information corresponding to the access detected in operation 204. In some embodiments, the location information captured in operation 206 can correspond to the location information 124 shown in FIG. 1. As noted above, the location accessed in operation 204 can correspond to a web address, an IP address, a URL, a URI, a file location, an network location (e.g., a network drive, cloud storage device, or the like), or the like. Thus, the location information captured in operation 206 can include a URL, a URI, an IP address, a web address, or other data that can identify the location of the resource accessed in operation 204.

From operation 206, the method 200 proceeds to operation 208. At operation 208, the computing device 102 can transmit the location information captured in operation 206 to the location sharing service 110. In some embodiments, the location information captured in operation 206 can correspond to the location information 124 shown in FIG. 1 and therefore can be included in a shared location stream 120. Thus, it should be understood that the computing device 102 can be configured to stream captured locations to a recipient such as the location sharing service 110. In some other embodiments, the location information captured in operation 206 can be transmitted as a data packet or package that is not included in a stream such as the shared location stream 120. Thus, it should be understood that the embodiment shown in FIG. 1 is illustrative of one contemplated embodiment and therefore should not be construed as being limiting in any way.

From operation 208, the method 200 proceeds to operation 210. At operation 210, the computing device 102 can determine if a user interface is to be presented at the computing device 102. In some embodiments, as explained above, the computing device 102 can be configured, by execution of the location sharing application 108, to generate and/or present a user interface at the computing device 102. The user interface can provide information relating to what locations have been shared with other users or devices, what locations have been received by the users or devices, what locations have been accessed by the users or devices, combinations thereof, or the like. Thus, operation 210 can correspond to the computing device 102 determining if a setting, option, or the like specifies that a user interface is to be generated and/or presented at the computing device 102.

If the computing device 102 determines, in operation 210, that a user interface is to be presented, the method 200 can proceed to operation 212. At operation 212, the computing device 102 can obtain a user interface update from the location sharing service 110. The location sharing service 110 can provide the status 122 illustrated and described above with reference to FIG. 1. Thus, the computing device 102 can obtain, in operation 212, the status 122. As noted above, the status 122 can indicate if a particular device received the shared location information, if the particular device accessed the shared location information, if an error occurred in delivery of the location information or access to the location, combinations thereof, or the like.

The update obtained in operation 212 also can indicate if a user has joined the conference or collaboration session (or other type of session illustrated and described herein), if a user has enabled or disabled the location sharing service, if a user has joined or exited the session, combinations thereof, or the like. Thus, the computing device 102 can be configured to update a user interface based upon these and other types of information. An example user interface is illustrated and described below with reference to FIG. 5B. It should be understood that this example is illustrative and therefore should not be construed as being limiting in any way.

From operation 212, the method 200 proceeds to operation 214. At operation 214, the computing device 102 can present the user interface at the computing device 102. Some example embodiments of the user interface are illustrated and described herein with reference to FIGS. 5A-5D. It should be understood that these examples are illustrative and therefore should not be construed as being limiting in any way.

From operation 214, the method 200 proceeds to operation 216. The method 200 also can proceed to operation 216 from operation 210, if the computing device 102 determines, in operation 210, that the user interface is not to be presented. The method 200 ends at operation 216.

Figure 3:
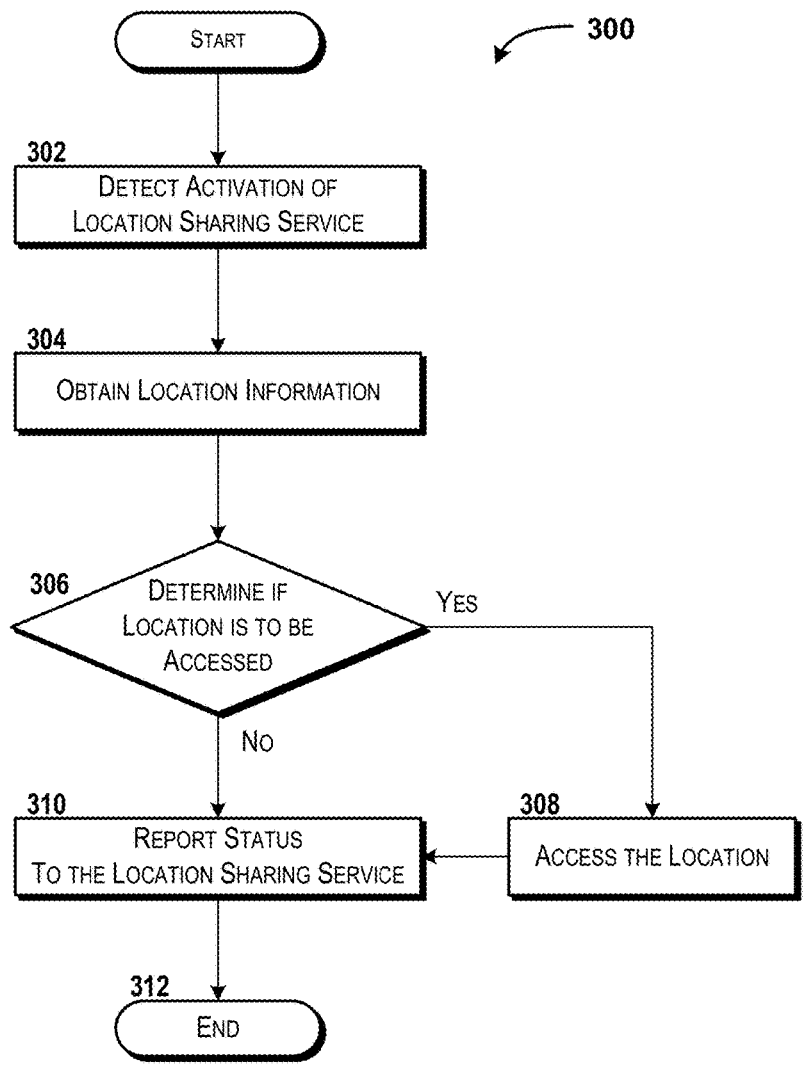
FIG. 3 is a flow diagram showing aspects of a method for accessing shared locations obtained from a location sharing service, according to an illustrative embodiment of the concepts and technologies described herein.

Turning now to FIG. 3, aspects of a method 300 for accessing locations shared by a location sharing service 110 will be described in detail, according to an illustrative embodiment. For purposes of illustrating and describing the concepts of the present disclosure, the method 300 is described as being performed by the user device 116 via execution of one or more software modules such as, for example, the application programs 118. It should be understood that additional and/or alternative devices and/or network nodes can provide the functionality described herein via execution of one or more modules, applications, and/or other software including, but not limited to, the application programs 118. Thus, the illustrated embodiments are illustrative, and should not be viewed as being limiting in any way.

The method 300 begins at operation 302. At operation 302, the user device 116 can detect activation of the location sharing service 110 and/or can detect activation of an option to interact with the location sharing service 110. According to some embodiments, as explained above with reference to operation 202 of FIG. 2, a location sharing session can be initiated or begun during initiation and/or configuration of a collaboration session, an online meeting, a conference, a remote support session, and/or during other types of sessions. In some embodiments, the application programs 118 executed by the user device 116 can include a conferencing application or service that can include functionality for interacting with the location sharing service 110. As such, initiation of a conference session, collaboration session, remote access, or the like can also initiate a location sharing session.

In some other embodiments, the location sharing session can be initiated separately from initiation of a conference session, collaboration session, remote access session, or the like. For example, the application programs 118 can include an application or other process that can be configured to obtain locations shared with conference participants by a presenter or other entity. Because the location sharing session can be initiated in additional and/or alternative ways, it should be understood that these examples are illustrative and therefore should not be construed as being limiting in any way.

From operation 302, the method 300 proceeds to operation 304. At operation 304, the user device 116 can obtain location information shared by the location sharing service 110. In some embodiments, the user device 116 can receive the information in operation 304 and in some other embodiments, the user device 116 can access the location information in operation 304.

In some embodiments, the location information obtained in operation 304 can correspond to the location information 124 shown in FIG. 1. Thus, the location information obtained in operation 304 can be included in a shared location stream 120 in some embodiments. Thus, while not shown in FIG. 3, it should be understood that operation 304 can include the user device 116 obtaining a shared location stream 120 and extracting, from the shared location stream 120, the location information 124. In some other embodiments, the location information 124 can be shared with the user device 116 as a packet or package of information and therefore may not be included in a stream of data. Because the location information can be obtained in operation 304 in a variety of ways, it should be understood that these examples are illustrative and therefore should not be construed as being limiting in any way.

From operation 304, the method 300 proceeds to operation 306. At operation 306, the user device 116 can determine if the location information obtained in operation 304 is to be accessed. According to various embodiments, the user device 116 can access or store various settings, preferences, and the like, in addition to executing an application program 118 that can control various aspects of the location sharing functionality illustrated and described herein. Thus, the user device 116 can determine based upon execution of the application and/or analysis of the settings, preferences, or the like, if the location is to be accessed.

In some embodiments, the user device 116 may determine that the location is to be accessed (or not accessed) by prompting a user or other entity for instructions regarding accessing the location. Thus, for example, a user interface can be presented for receiving user input regarding accessing (or not accessing) the location. In some other embodiments, the settings or options can specify if locations are to be accessed or not accessed. Because the determination as to whether or not a location is to be accessed can be based upon various considerations as illustrated and described herein, it should be understood that this determination in operation 306 can be made in number of manners. Various aspects of configuring settings and options for the location sharing service 110 and/or for presenting prompts for obtaining user instructions regarding accessing locations are illustrated and described with reference to FIGS. 5C-5D. It should be understood that these examples are illustrative and therefore should not be construed as being limiting in any way.

If the user device 116 determines, in operation 306, that the location extracted from the shared location stream is to be accessed, the method 300 proceeds to operation 308. At operation 308, the user device 116 can access the location extracted from the shared location stream 120. Thus, in operation 308 the user device 116 can access a web page, a file location, a document, a URL, a URI, and/or other locations corresponding to the obtained location information. Thus, it can be appreciated that the user device 116 can pass the location information to a web browser (or other application program 118) and the web browser can access the location. In some embodiments, the user device 116 executes a plugin that can pass the location information to a web browser or other application as illustrated and described herein. It should be understood that this example is illustrative and therefore should not be construed as being limiting in any way.

From operation 308, the method 300 proceeds to operation 310. The method 300 also can proceed to operation 310 from operation 306 if the user device 116 determines, in operation 306, that the location shared by the location sharing service 110 is not to be accessed. At operation 310, the user device 116 can report a status 122 to the location sharing service 110. The status 122 can include an indication that the user device 116 received the shared location information, that the user device 116 has accessed the shared location information, that the user device 116 has opted-in or enabled receiving shared location information, that the user device 116 has opted-out or disabled receiving shared location information, that the user device 116 has joined a conference or other session, that the user device 116 is leaving the conference or other session, combinations thereof, or the like. The location sharing service 110 can use the status 122 to provide updates to a presenter, in some embodiments, as will be illustrated and described in more detail below with reference to FIG. 4. It should be understood that this example is illustrative and therefore should not be construed as being limiting in any way.

From operation 310, the method 300 proceeds to operation 312. The method 300 ends at operation 312.

Figure 4:
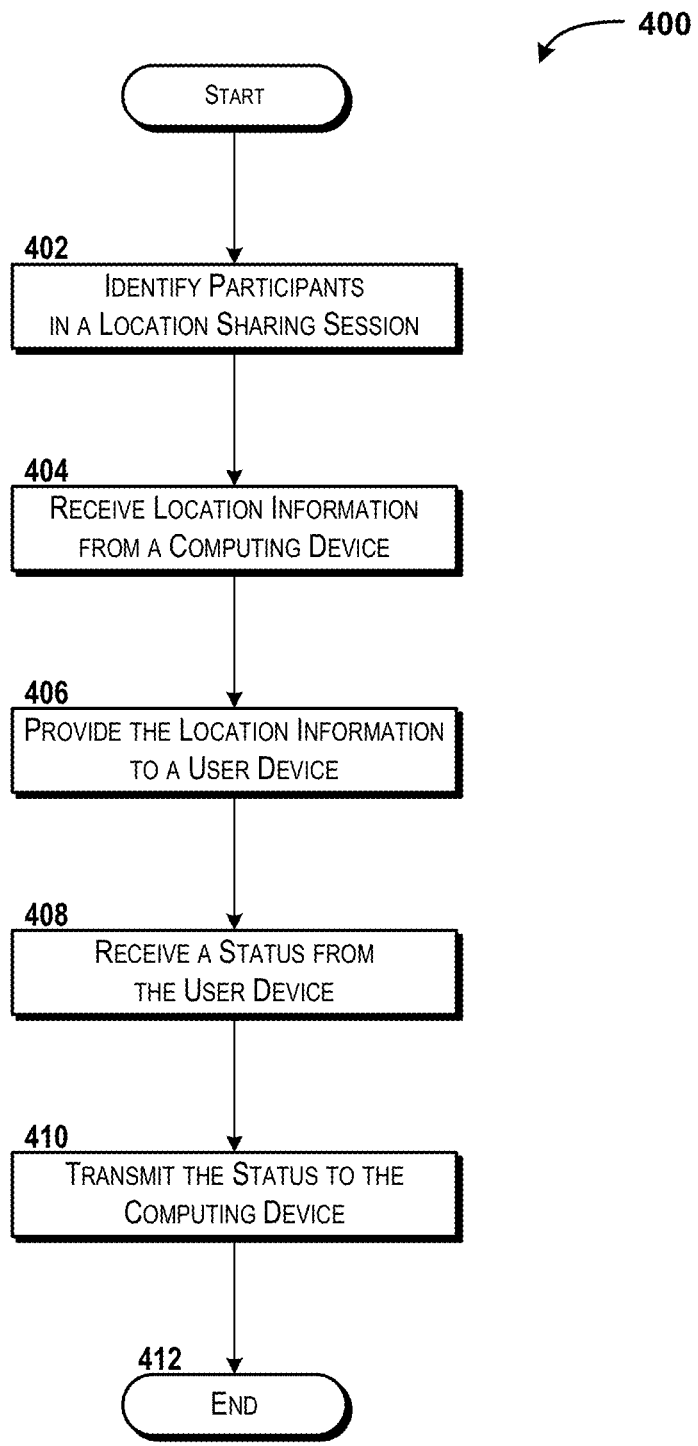
FIG. 4 is a flow diagram showing aspects of a method for providing a location sharing service, according to an illustrative embodiment of the concepts and technologies described herein.

Turning now to FIG. 4, aspects of a method 400 for providing a location sharing service 110 will be described in detail, according to an illustrative embodiment. For purposes of illustrating and describing the concepts of the present disclosure, the method 400 is described as being performed by the server computer 112 via execution of one or more software modules such as, for example, the location sharing service 110. It should be understood that additional and/or alternative devices and/or network nodes can provide the functionality described herein via execution of one or more modules, applications, and/or other software including, but not limited to, the location sharing service 110. Thus, the illustrated embodiments are illustrative, and should not be viewed as being limiting in any way.

The method 400 begins at operation 402. At operation 402, the server computer 112 can identify one or more participants in a location sharing session. Although not separately shown in FIG. 4, it should be understood that the participants can include a presenter (a party that shares location information with the location sharing service 110) and a participant (a party that is to receive the location information from the location sharing service 110). Thus, at least two "participants" typically will be identified in operation 402, with the first "participant" corresponding to a presenter (who shares location information) and the second and (optionally) subsequent "participants" corresponding to the recipients of the shared location information. It should be understood that this example is illustrative and therefore should not be construed as being limiting in any way.

In various embodiments, the server computer 112 can receive conference information from a presenter or other entity. The conference information can be included in the presentation data 114 as the identifiers, the participant data, and/or the other information. Thus, the conference information can identify users that are to join the conference or other session, authentication information (if desired), and which users have enabled location sharing as illustrated and described herein. In some other embodiments, the server computer 112 can identify the participants in the location sharing session by receiving indications from one or more participants that location sharing has been enabled. As noted above, these indications can be obtained by the server computer 112 as the status 122. It should be understood that this example is illustrative and therefore should not be construed as being limiting in any way.

From operation 402, the method 400 proceeds to operation 404. At operation 404, the server computer 112 can receive or otherwise obtain (e.g., access or download) location information from a computing device such as the computing device 102. According to various embodiments as illustrated and described herein, the computing device 102 can be associated with a presenter in the conference or other session. In some embodiments, the location information obtained in operation 404 can correspond to the location information 124 shown in FIG. 1. Thus, the location information obtained in operation 404 can be included in a shared location stream 120 in some embodiments. In some other embodiments, the location information 124 can be shared with the server computer 112 as a packet or package of information and therefore may not be included in a stream of data. Because the location information can be obtained in operation 404 in a variety of manners, it should be understood that these examples are illustrative and therefore should not be construed as being limiting in any way.

From operation 404, the method 400 proceeds to operation 406. At operation 406, the server computer 112 can provide the location information obtained in operation 404 to a user device such as the user device 116. According to various embodiments, the server computer 112 can transmit the location information to the user device 116 and/or can stream the location information to the user device as or in the shared location stream 120. In some embodiments, the shared location stream 120 can be used to allow real-time updating at the user device 116. It should be understood that this example is illustrative and therefore should not be construed as being limiting in any way.

From operation 406, the method 400 proceeds to operation 408. At operation 408, the server computer 112 can receive a status 122 from the user device 116. As explained above with reference to operation 312 in FIG. 3, the status 122 can include an indication that the user device 116 received the shared location information, that the user device 116 accessed the shared location information, that the user device 116 opted-in or enabled receiving shared location information, that the user device 116 opted-out or disabled receiving shared location information, that the user device 116 joined a conference or other session, that the user device 116 left the conference or other session, combinations thereof, or the like. The server computer 112 can use the status 122 to provide updates to a presenter, in some embodiments. It should be understood that this example is illustrative and therefore should not be construed as being limiting in any way.

From operation 408, the method 400 proceeds to operation 410. At operation 410, the server computer 112 can transmit the status 122 to the computing device 102. In some embodiments, the computing device 102 can opt-in or enable status updates. Thus, the location sharing service 110 executed by the server computer 112 can cause the server computer 112 to transmit status updates to the computing device 102, in some embodiments. Thus, operation 410 can include the server computer 112 analyzing settings or options and determining, based upon the settings or options, that the computing device 102 is to receive status updates. If the server computer 112 determines that the computing device 102 is not to receive updates, the method 400 can end at operation 406 or 408, though this is not separately shown in FIG. 4.

From operation 410, the method 400 proceeds to operation 412. The method 400 ends at operation 412.

Figure 5A:
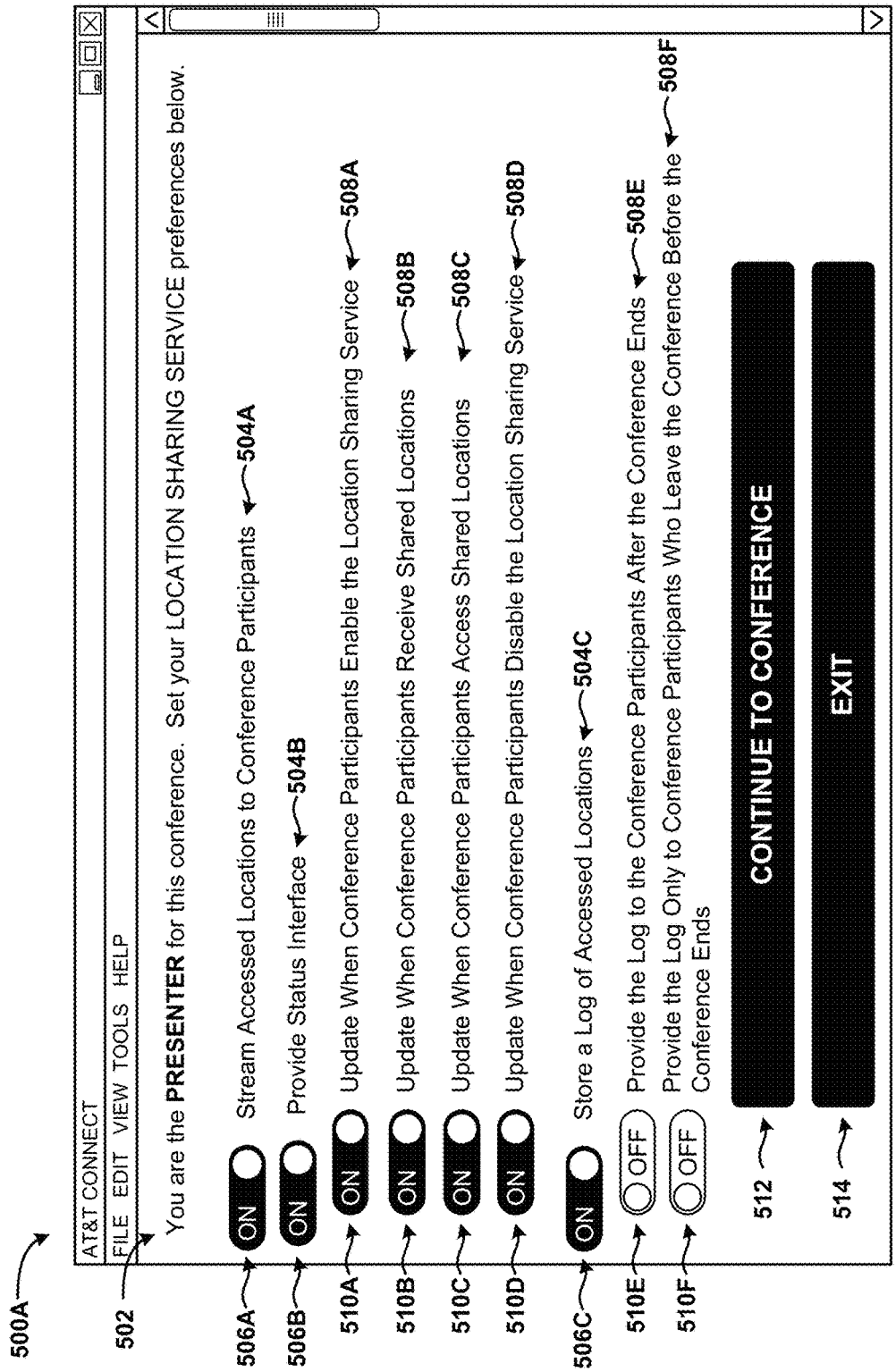
FIGS. 5A-5D are user interface diagrams showing various screen displays for interacting with a location sharing service, according to some illustrative embodiments of the concepts and technologies described herein.
Figure 5B:
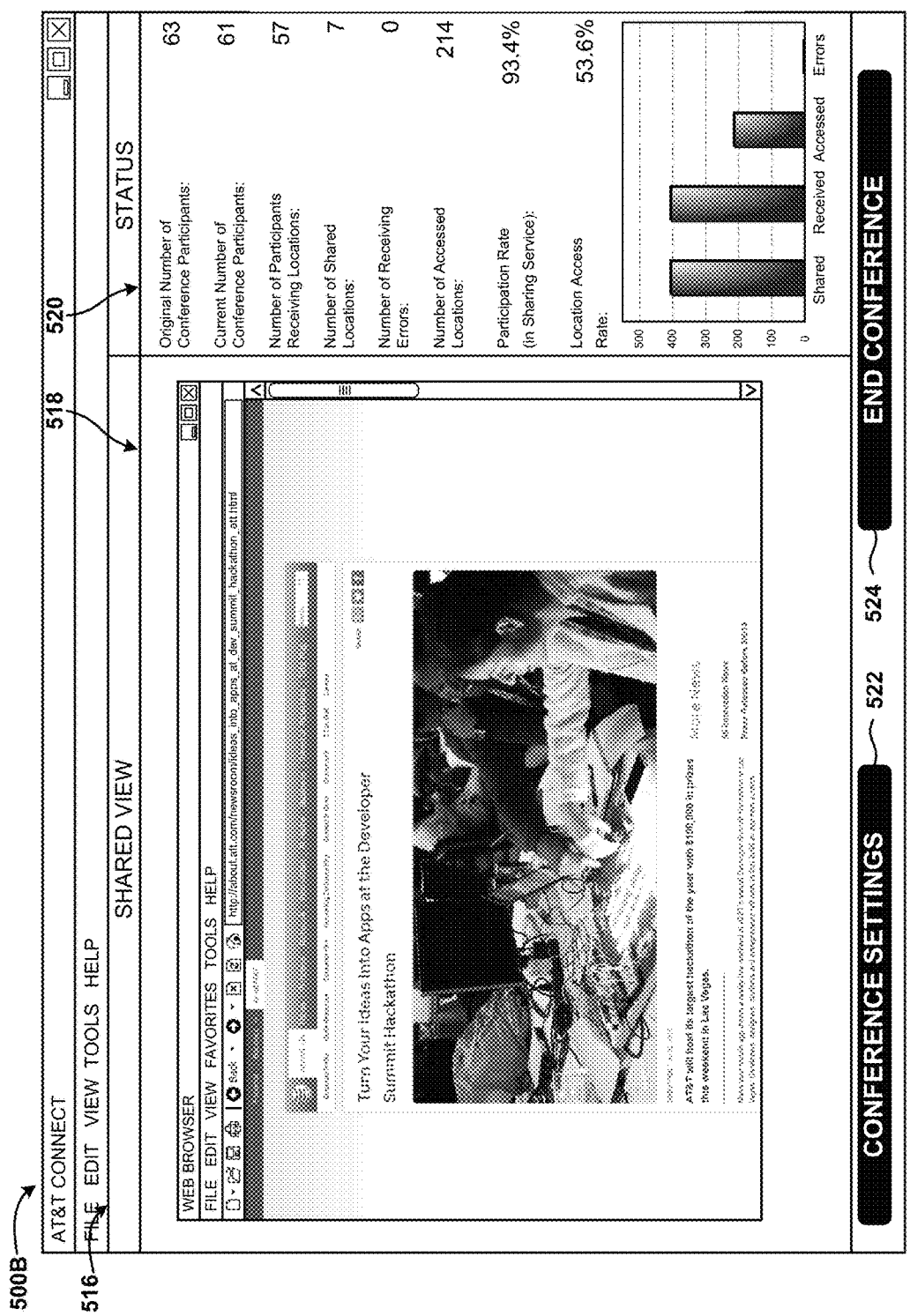

FIGS. 5A-5B are user interface ("UI") diagrams showing aspects of UIs for using and/or interacting with a location sharing service 110, according to some illustrative embodiments. FIG. 5A shows an illustrative screen display 500A, which can be generated by a device such as the computing device 102. According to various embodiments, the computing device 102 can generate the screen display 500A and/or other screen displays in conjunction with and/or based upon activation of the location sharing application 108 and/or interactions with the location sharing service 110 described herein. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, in response to detecting activation of the location sharing application 108, a presentation application, or the like. The screen display 500A also (or alternatively) can be presented in response to detecting starting or activation of the location sharing service 110 and/or initiation of communications with the location sharing service 110, other triggers or events, combinations thereof, or the like. Because the screen display 500A illustrated in FIG. 5A can be displayed at additional and/or alternative times, it should be understood that this example is illustrative and therefore should not be construed as being limiting in any way.

The screen display 500A can include various menus and/or menu options (not shown in FIG. 5A). The screen display 500A also can include a location sharing service options display 502. The location sharing service options display 502 can be configured to allow a user or other entity to control various options associated with the location sharing application 108, the location sharing service 110, a conferencing application, a conferencing service, combinations thereof, or the like. As shown in FIG. 5A, the location sharing service options display 502 can include a number of location sharing service settings 504A-C (hereinafter collectively and/or generically referred to as "location sharing service settings 504"). Each of the location sharing service settings 504 can have a corresponding location sharing service setting control 506A-C (hereinafter collectively and/or generically referred to as "location sharing service setting controls 506").

A user or other entity can interact with the location sharing service setting controls 506 to enable/disable the corresponding location sharing service settings 504. In some embodiments, as illustrated in FIG. 5A, selection of some of the location sharing service setting controls 506 can cause the computing device 102 to display sub-menu settings 508A-F (hereinafter collectively and/or generically referred to as "sub-menu settings 508") and corresponding sub-menu controls 510A-F (hereinafter collectively and/or generically referred to as "sub-menu controls 510") that may be associated with the selected location sharing service setting control 506. For example, selection of the location sharing service setting control 506B can cause the computing device 102 to display the sub-menu settings 508A-D and the corresponding sub-menu controls 510A-D. In another example, selection of the location sharing service setting control 506C can cause the computing device 102 to display the sub-menu settings 508E-F and the corresponding sub-menu controls 510E-F. It should be understood that this example is illustrative and therefore should not be construed as being limiting in any way.

According to various embodiments, the location sharing service setting controls 506 can be replaced with fields, check boxes, dropdown boxes, and/or other controls for setting or controlling location sharing service settings. As such, it should be understood that various relative and/or absolute schemes or systems can be used to specify grades, weights, values, combinations thereof, or the like. Because various absolute and/or relative value schemes are possible and are contemplated, it should be understood that the above-mentioned ranking values and scales are illustrative and therefore should not be construed as being limiting in any way.

In the illustrated embodiment, the location sharing service setting control 506A can be used to enable or disable an option to stream accessed locations to conference participants; the location sharing service setting control 506B can be used to enable or disable an option to provide a status interface relating to the location sharing service 110 at the computing device 102 or elsewhere; and the location sharing service setting control 506C can be used to enable or disable an option to store a log of accessed locations (locations shared by the computing device 102). Because additional and/or alternative location sharing service setting controls 506 can be included in the location sharing service options display 502, it should be understood that these examples are illustrative and therefore should not be construed as being limiting in any way.

In the illustrated embodiment, the sub-menu control 510A can be used to enable or disable an option to provide a status interface update when a conference participant enables the location sharing service 110; the sub-menu control 510B can be used to enable or disable an option to provide a status interface update when a conference participant receives a shared location via the location sharing service 110; the sub-menu control 510C can be used to enable or disable an option to provide a status interface update when a conference participant accesses a location shared via the location sharing service 110; and the sub-menu control 510D can be used to enable or disable an option to provide a status interface update when a conference participant disables the location sharing service 110. Similarly, the sub-menu control 510E can be used to enable or disable an option to provide a log of accessed locations to conference participants when the conference ends, and the sub-menu control 510F can be used to enable or disable an option to provide the log of accessed locations only to conference participants who leave the conference before the conference is over. Because additional and/or alternative sub-menu controls 510 can be included in the location sharing service options display 502, it should be understood that these examples are illustrative and therefore should not be construed as being limiting in any way.

The location sharing service options display 502 also can include a UI control 512 that, when selected, proceeds with conference setup or returns to an active conference. Thus, it can be appreciated that the location sharing service options display 502 can be displayed during a conference via selection of an "options" display, or the like; or upon setup of a conference (e.g., during login by the conference presenter or host). It should be understood that this example is illustrative and therefore should not be construed as being limiting in any way. The location sharing service options display 502 also can include a UI control 514 to exit the location sharing service options display 502. Because additional or alternative controls can be included in the location sharing service options display 502, it should be understood that these examples are illustrative and therefore should not be construed as being limiting in any way.

Referring now to FIG. 5B, a UI diagram showing additional aspects of the concepts and technologies disclosed herein for providing a location sharing service 110 is described in detail. In particular, FIG. 5B shows an illustrative screen display 500B, which can be generated by a device such as the computing device 102. As indicated above with reference to FIG. 5A, the screen display 500B can be generated by the computing device 102 via execution of the location sharing application 108 and/or via interactions with the location sharing service 110, in some embodiments. It should be appreciated that the UI diagram illustrated in FIG. 5B is illustrative of one contemplated example of the UIs that can be generated and/or displayed in accordance with the concepts and technologies disclosed herein, and therefore should not be construed as being limited in any way.

The screen display 500B can include a conference information display 516. The conference information display 516 can be used to view conference content; information associated with the conference; location sharing service status and/or information; combinations thereof; or the like. As shown in FIG. 5B, the conference information display 516 can include a conference view panel 518 and a location sharing service status panel 520. It should be understood that this example is illustrative and therefore should not be construed as being limiting in any way.

The conference view panel 518 can show a representation of a shared view. In some embodiments, the conference view panel 518 can present a view of what the conference participants see. Thus, it can be appreciated that the content within the conference view panel 518 can be manipulated by a user of the computing device 102, in some embodiments, for example to access web pages, to run applications, to view documents, combinations thereof, or the like. In the illustrated embodiment, a web browser screen is shown in the conference view panel 518. It should be understood that this example is illustrative and therefore should not be construed as being limiting in any way.

The location sharing service status panel 520 can present information relating to the location sharing service 110. Thus, the location sharing service status panel 520 can present information relating to how many conference participants are joined, how many conference participants have left the conference, a number of shared locations during the conference, a number of conference participants who have enabled location streaming, a number of errors received with regard to sharing locations, a number of accessed locations during the conference, a participation rate (among conference participants in the location sharing service 110), a location access rate, a graphical user interface showing some location sharing service information, other information and/or visual elements, combinations thereof, or the like.

The number of accessed locations can correspond to a total number of location accesses during the conference. Thus, for example, if a conference has one hundred participants and the presenter has shared three locations, the total number of shared locations can be three and the number of accessed locations can correspond to a number of the one hundred participants that have accessed one or more of the three locations. Thus, in the illustrated embodiment, of a total of at least (57 current participants receiving locations times 7 shared locations=399 shared locations), the location sharing service 110 has detected 214 location accesses. This corresponds to a location access rate of (214/399=)53.6%. It should be understood that this example is illustrative and therefore should not be construed as being limiting in any way.

The participation rate can correspond to a rate at which conference participants are using the location sharing service 110. In the illustrated embodiment, 93.4% of the conference participants are using the location sharing service 110. It should be understood that this example is illustrative and therefore should not be construed as being limiting in any way. The graphical display can show numbers of shared locations, numbers of received locations, numbers of accessed locations, numbers of errors, combinations thereof, or the like. In the illustrated embodiment, there have been no receiving errors and as such, the number of received locations is the same as the number of shared locations, namely 7 times 57=399. It should be understood that this example is illustrative and therefore should not be construed as being limiting in any way.

Thus, the conference information display 516 can provide a user with one or more views of a conference as well as information relating to the conference and/or status information relating to use of the location sharing service 110. The conference information display 516 also can include a UI control 522 for accessing conference and/or location sharing service settings and a UI control 524 for ending the conference. It can be appreciated that selection of the UI control 522 can cause the computing device 102 to display settings or options relating to the conference and/or the location sharing service 110. An example embodiment of a user interface for accessing settings associated with the location sharing service 110 has been illustrated and described above with reference to FIG. 5A. Because other displays can be generated and/or presented in response to selection of the UI control 522, it should be understood that this example is illustrative and therefore should not be construed as being limiting in any way.

Figure 5C:
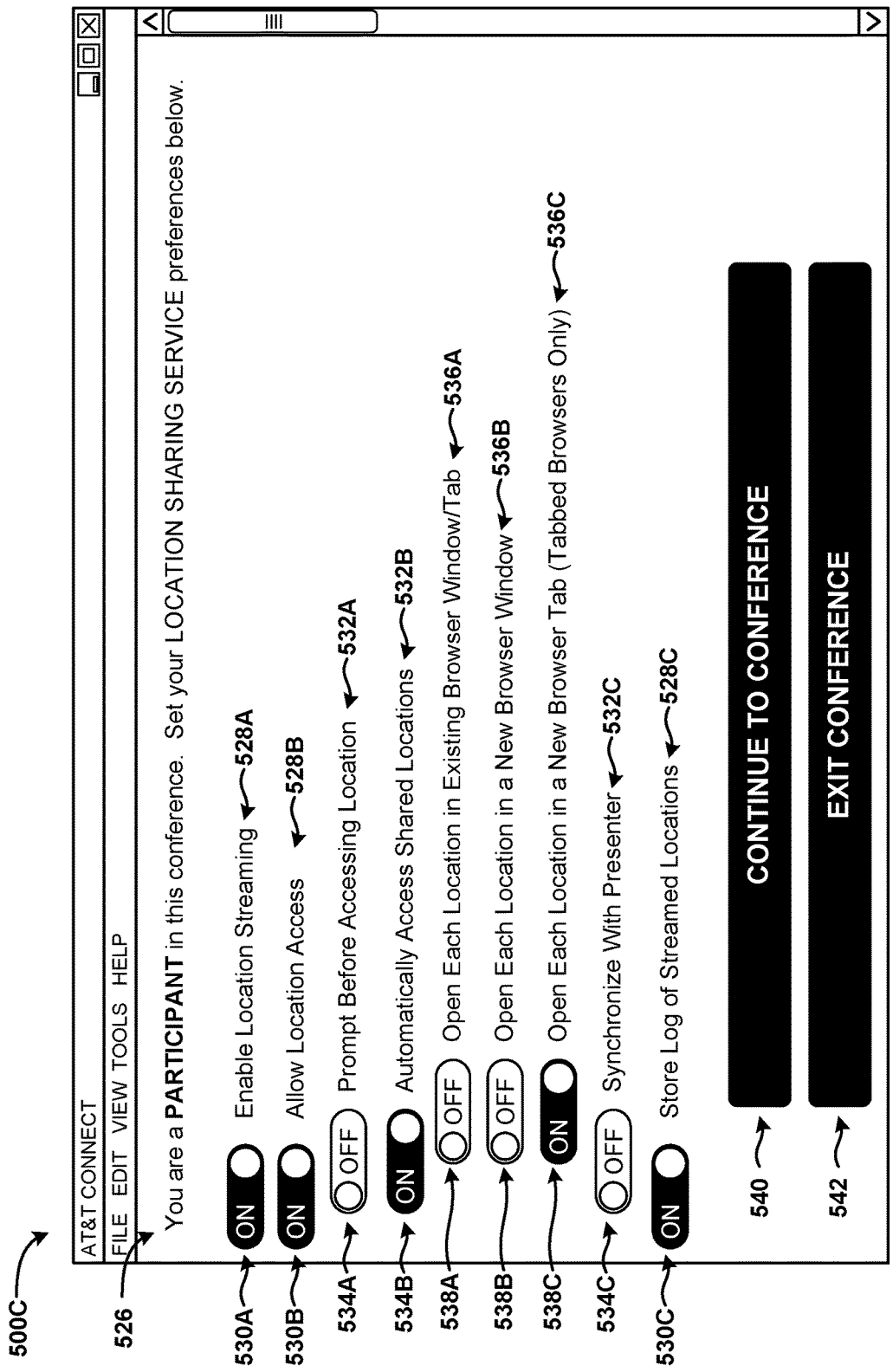

Referring now to FIG. 5C, a UI diagram showing additional aspects of the concepts and technologies disclosed herein for providing a location sharing service 110 is described in detail. In particular, FIG. 5C shows an illustrative screen display 500C, which can be generated by a device such as the user device 116. In some embodiments, the screen display 500C can be generated by the user device 116 via execution of an application program 118 such as a web browser, a conferencing application, a location sharing application (which can be similar or even identical to the location sharing application 108 executed by the computing device 102), and/or other applications. The screen display 500C also can be generated based upon data obtained during or based upon interactions with the location sharing service 110, in some embodiments. It should be appreciated that the UI diagram illustrated in FIG. 5C is illustrative of one contemplated example of the UIs that can be generated and/or displayed in accordance with the concepts and technologies disclosed herein, and therefore should not be construed as being limited in any way.

The screen display 500C can include a conference participant location sharing service options display 526. The conference participant location sharing service options display 526 can be used by a conference participant (other than the presenter) to view and/or set options associated with the location sharing service 110. As shown in FIG. 5C, the conference participant location sharing service options display 526 can include a number of participant location sharing service settings 528A-C (hereinafter collectively and/or generically referred to as "participant location sharing service settings 528"). Each of the participant location sharing service settings 528 can have a corresponding participant location sharing service setting control 530A-C (hereinafter collectively and/or generically referred to as "participant location sharing service setting controls 530").

A user or other entity can interact with the participant location sharing service setting controls 530 to enable/disable the corresponding participant location sharing service settings 528. In some embodiments, as illustrated in FIG. 5C, selection of some of the participant location sharing service setting controls 530 can cause the computing device 102 to display sub-menu settings 532A-C (hereinafter collectively and/or generically referred to as "sub-menu settings 532") and corresponding sub-menu controls 534A-C (hereinafter collectively and/or generically referred to as "sub-menu controls 534") that may be associated with the selected participant location sharing service setting control 530. For example, selection of the participant location sharing service setting control 530B can cause the computing device 102 to display the sub-menu settings 532A-C and the corresponding sub-menu controls 534A-C. It should be understood that this example is illustrative and therefore should not be construed as being limiting in any way.

In some embodiments, as illustrated in FIG. 5C, selection of some of the sub-menu controls 534 can cause the computing device 102 to display sub-sub-menu settings 536A-C (hereinafter collectively and/or generically referred to as "sub-sub-menu settings 536") and corresponding sub-sub-menu controls 538A-C (hereinafter collectively and/or generically referred to as "sub-sub-menu controls 538") that may be associated with the selected sub-menu control 534. For example, selection of the sub-menu control 534B can cause the computing device 102 to display the sub-sub-menu settings 536A-C and the corresponding sub-sub-menu controls 538A-C. It should be understood that this example is illustrative and therefore should not be construed as being limiting in any way.

According to various embodiments, the participant location sharing service setting controls 530, sub-menu controls 534, and/or the sub-sub-menu controls 538 can be replaced with fields, check boxes, dropdown boxes, and/or other controls for setting or controlling location sharing service settings. As such, it should be understood that various relative and/or absolute schemes or systems can be used to specify grades, weights, values, combinations thereof, or the like. Because various absolute and/or relative value schemes are possible and are contemplated, it should be understood that the above-mentioned ranking values and scales are illustrative and therefore should not be construed as being limiting in any way.

In the illustrated embodiment, the participant location sharing service setting control 530A can be used to enable or disable an option to receive streamed locations from a conference presenter; the participant location sharing service setting control 530B can be used to enable or disable an option to access received streamed locations; and the participant location sharing service setting control 530C can be used to enable or disable an option to store a log of accessed locations (locations shared by the computing device 102). Because additional and/or alternative participant location sharing service setting controls 530 can be included in the conference participant location sharing service options display 526, it should be understood that these examples are illustrative and therefore should not be construed as being limiting in any way.

In the illustrated embodiment, the sub-menu control 534A can be used to enable or disable an option to prompt the conference participant each time a location is shared by the presenter via the location sharing service 110. Thus, selection of the sub menu control 534A can cause the user device 116 to present a prompt each time a location is received, the prompt questioning the user as to whether the location should be accessed, stored in a log, and/or ignored. An example user interface for prompting the conference participant is illustrated and described below with reference to FIG. 5D. Because other types of prompts are possible and are contemplated, it should be understood that this example is illustrative and therefore should not be construed as being limiting in any way.

The sub-menu control 534B can be used to enable or disable an option to automatically access shared locations obtained via the location sharing service 110. It can be appreciated that selection of the sub-menu control 534A can cause deselection of the sub-menu control 534B and/or that selection of the sub-menu control 534B can cause deselection of the sub-menu control 534A. It should be understood that this example is illustrative and therefore should not be construed as being limiting in any way.

The sub-menu control 534C can be used to enable or disable an option to synchronize a presenter's device with the conference participant when the presenter shares a location using the location sharing service 110. It can be appreciated that selection of the sub-menu control 534C can cause deselection of the sub-menu control 534A and/or that selection of the sub-menu control 534A can cause deselection of the sub-menu control 534C. Sub-menu controls 534B and 534C may or may not be tied to one another and therefore may or may not cause selection and/or deselection of other sub-menu controls 534. It should be understood that this example is illustrative and therefore should not be construed as being limiting in any way. Furthermore, because additional and/or alternative sub-menu controls 534 can be included in the conference participant location sharing service options display 526, it should be understood that the example sub-menu controls 534 are illustrative and therefore should not be construed as being limiting in any way.

The sub-sub-menu control 538A can be used to enable or disable an option to open an accessed location (shared via the location sharing service 110) in an existing browser window or tab; the sub-sub-menu control 538B can be used to enable or disable an option to open an accessed location (shared via the location sharing service 110) in a new browser window; and the sub-sub-menu control 538C can be used to enable or disable an option to open an accessed location (shared via the location sharing service 110) in a new browser tab. It should be understood that this example is illustrative and therefore should not be construed as being limiting in any way. Because additional and/or alternative sub-sub-menu controls 538 can be included in the conference participant location sharing service options display 526, it should be understood that these examples are illustrative and therefore should not be construed as being limiting in any way.

The conference participant location sharing service options display 526 also can include a UI control 540 that, when selected, proceeds to a conference setup or to an active conference. Thus, it can be appreciated that the conference participant location sharing service options display 526 can be displayed during a conference via selection of an "options" display, or the like; or upon setup of a conference (e.g., during login by the conference participant). It should be understood that this example is illustrative and therefore should not be construed as being limiting in any way. The conference participant location sharing service options display 526 also can include a UI control 542 to exit the conference. Because additional or alternative controls can be included in the conference participant location sharing service options display 526, it should be understood that these examples are illustrative and therefore should not be construed as being limiting in any way.

Figure 5D:
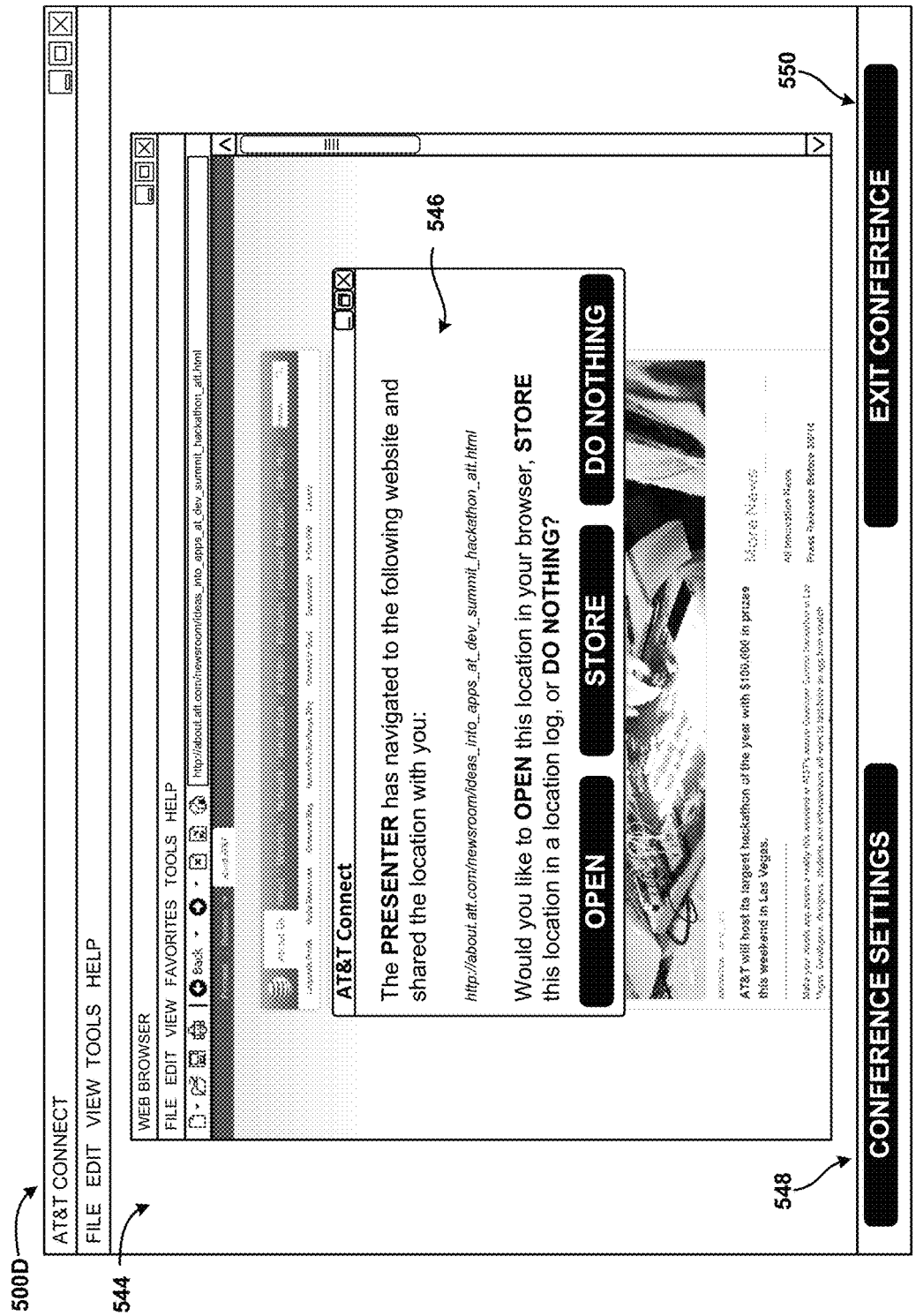

Referring now to FIG. 5D, a UI diagram showing additional aspects of the concepts and technologies disclosed herein for providing a location sharing service 110 is described in detail. In particular, FIG. 5D shows an illustrative screen display 500D, which can be generated by a device such as the user device 116. In some embodiments, the screen display 500D can be generated by the user device 116 via execution of an application program 118 such as a web browser, a conferencing application, a location sharing application (which can be similar or even identical to the location sharing application 108 executed by the computing device 102), and/or other applications. The screen display 500D also can be generated based upon data obtained during or based upon interactions with the location sharing service 110, in some embodiments. It should be appreciated that the UI diagram illustrated in FIG. 5D is illustrative of one contemplated example of the UIs that can be generated and/or displayed in accordance with the concepts and technologies disclosed herein, and therefore should not be construed as being limited in any way.

The screen display 500D can include a conference view display 544. The conference view display 544 can be used by a conference participant to view a conference being participated in by the participant. As shown in FIG. 5D, the conference view display 544 can include a view of a shared screen, which in the illustrated embodiment is showing a web browser that is displaying a web page. It can be appreciated that the conference view display 544 can essentially match the conference view panel 518 illustrated and described above with reference to FIG. 5B, though this is not necessarily the case. In the illustrated example, the conference view display 544 essentially matches the conference view panel 518 because the presenter is sharing his or her screen with the participant. It should be understood that this example is illustrative and therefore should not be construed as being limiting in any way.

In the illustrated embodiment, screen display 500D is shown as presenting a prompt 546. The prompt 546 can indicate, to the participant or other entity viewing the screen display 500D, that the presenter has shared a location. The prompt 546 also can request instructions from the participant or other entity. In the illustrated embodiment, the prompt 546 can request one of three instructions, which can correspond to three UI controls. In particular, the prompt 546 can ask a participant if he or she wants to open the shared location, store the shared location in a location log, or ignore the shared location. It should be appreciated that the prompt 546 can be presented if a participant does not select an option to automatically access shared locations and/or an option to synchronize with the presenter as illustrated and described above with reference to FIG. 5C. It should be understood that this example is illustrative and therefore should not be construed as being limiting in any way, Thus, a participant or other entity can select one of the UI controls presented in the prompt 546 to access a shared location, in which case the user device 116 may open the shared location in a web browser or other application. The participant or other entity also can select an option to store the location in a location log, or do nothing. After selecting an option, the prompt 546 can be hidden. It should be understood that this example is illustrative and therefore should not be construed as being limiting in any way.

The screen display 500D also can include a UI control 548 that, when selected, opens a conference settings page and/or options for a location sharing service 110. Thus, it can be appreciated that selection of the UI control 548 can prompt the user device 116 to display the screen display 500C illustrated and described above with reference to FIG. 5C, though this is not necessarily the case. The screen display 500D also can include a UI control 550 to exit the conference. Because additional or alternative controls can be included in the screen display 500D, it should be understood that these examples are illustrative and therefore should not be construed as being limiting in any way.

Figure 6:
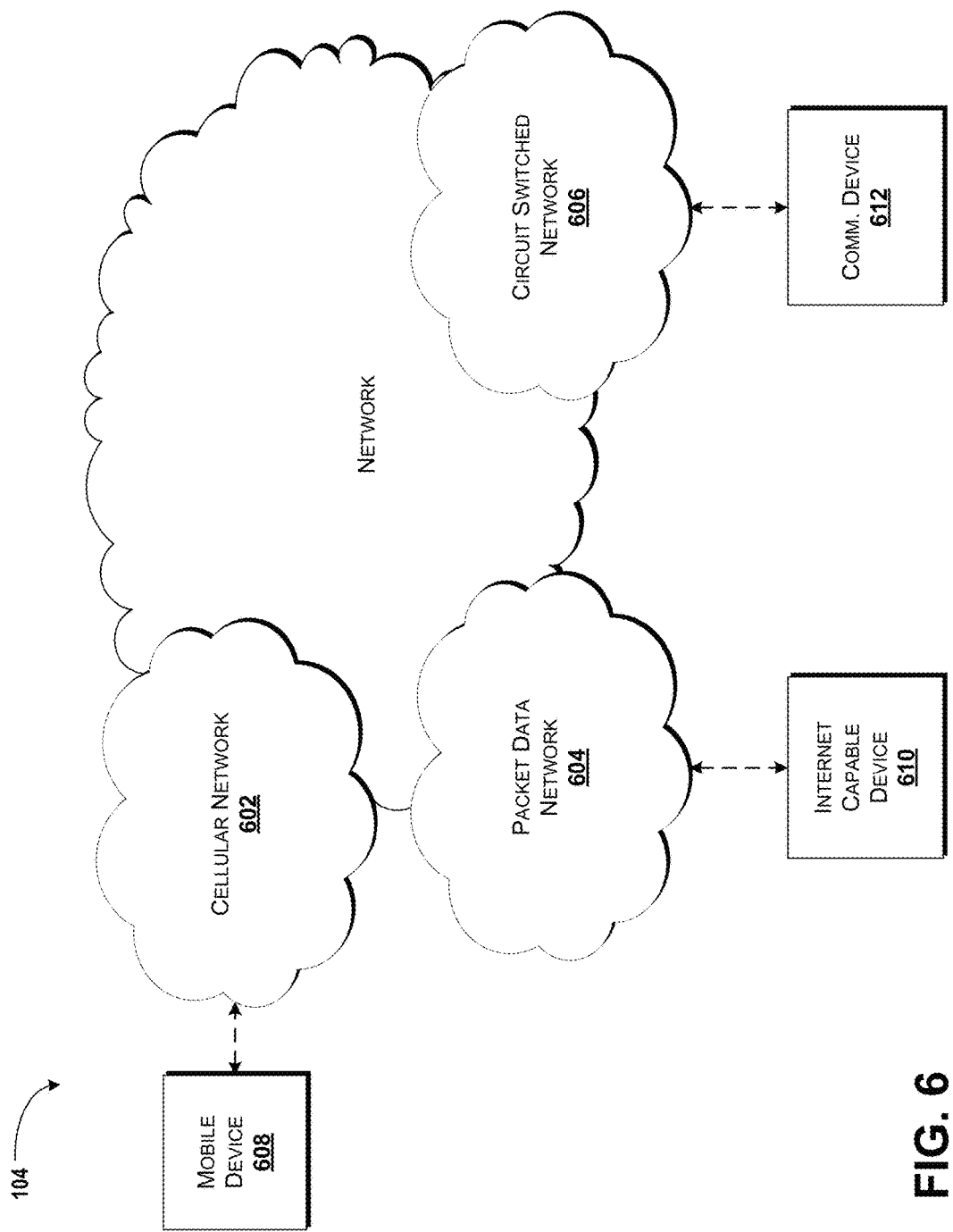
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
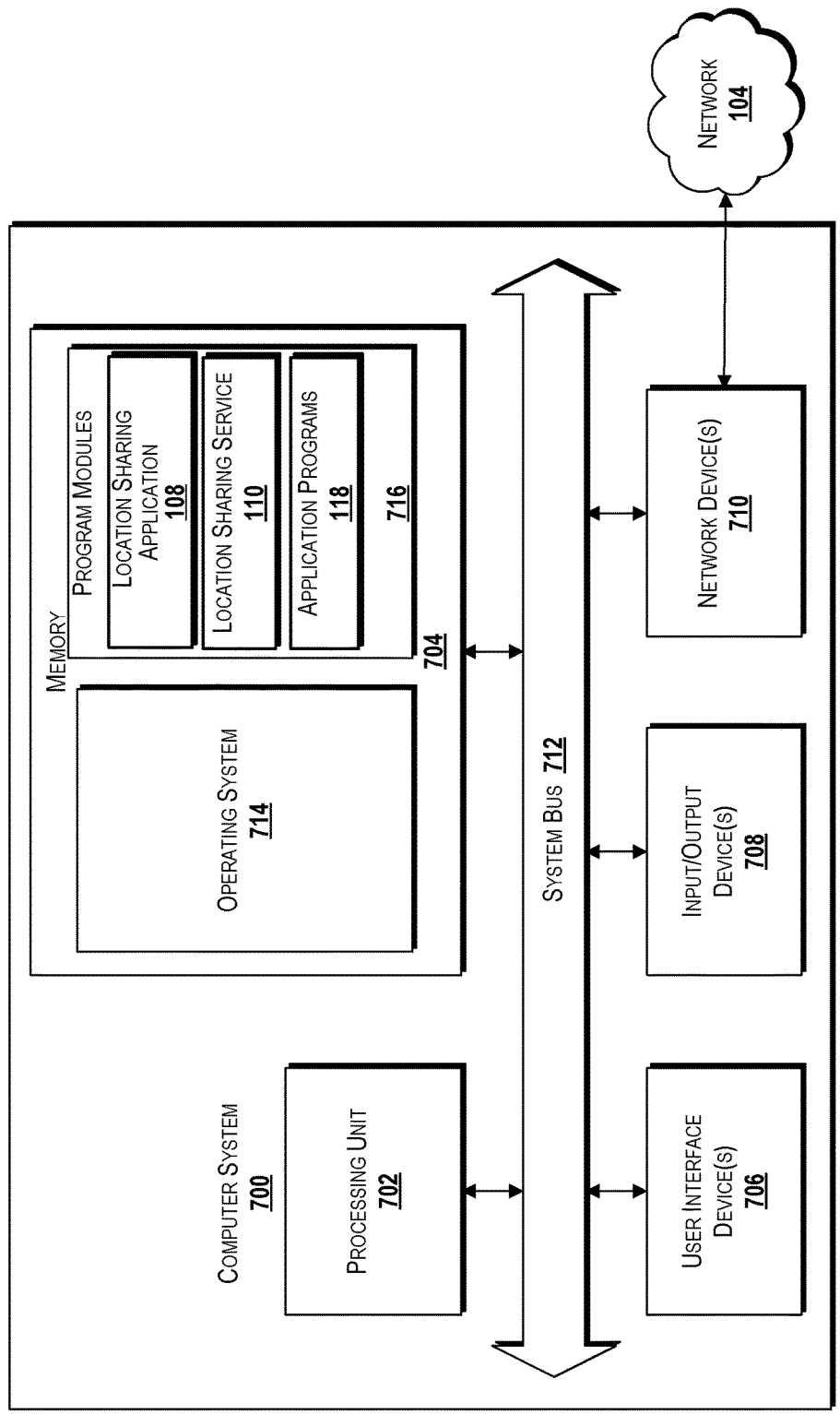
FIG. 7 is a block diagram illustrating an example computer system configured to provide and/or interact with a location sharing service, according to some illustrative embodiments of the concepts and technologies described herein.

FIG. 7 is a block diagram illustrating a computer system 700 configured to provide the functionality described herein for providing and/or interacting with a location sharing service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 can include the location sharing application 108, the location sharing service 110, and/or the application programs 118. This and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the presentation data 114, the shared location stream 120, the status 122, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
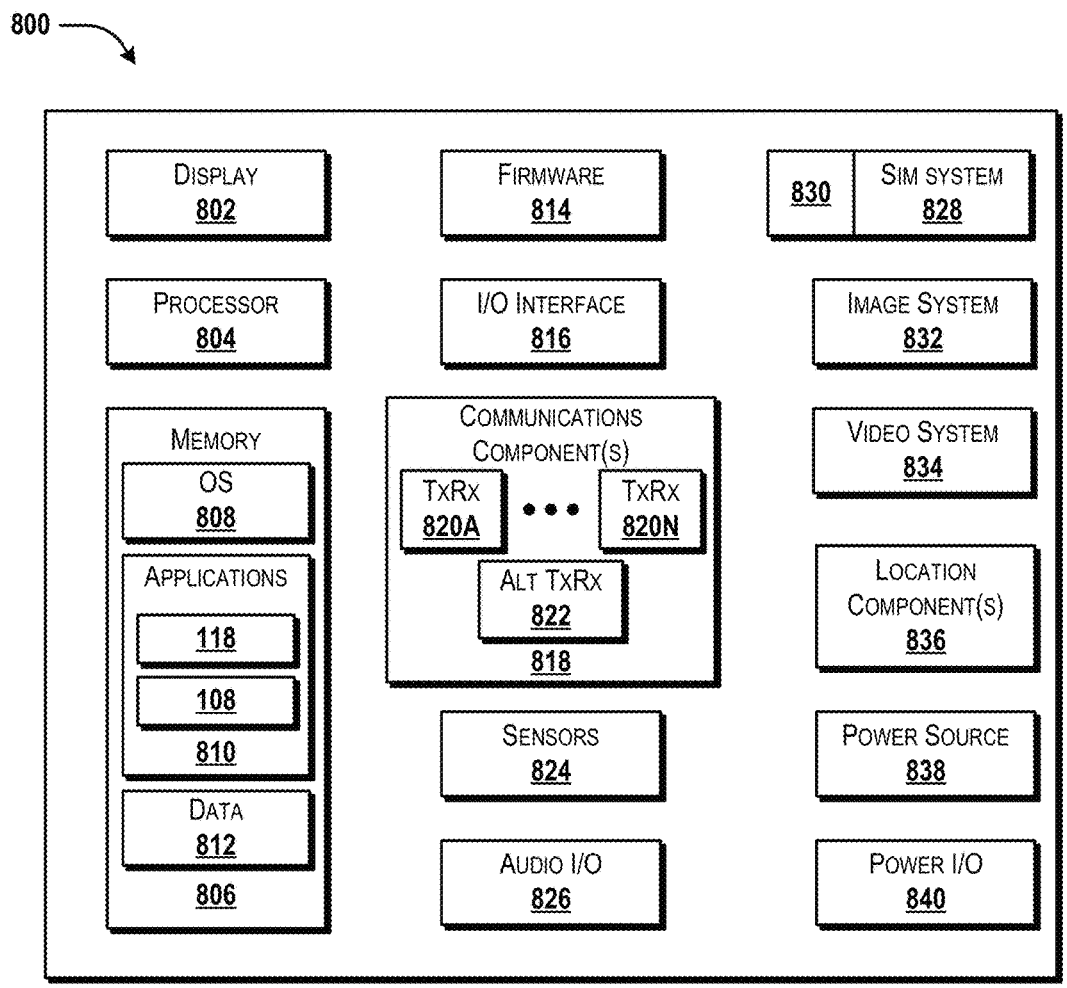
FIG. 8 is a block diagram illustrating an example mobile device configured to interact with a location sharing service, according to some illustrative embodiments of the concepts and technologies described herein.

Turning now to FIG. 8, an illustrative mobile device 800 and components thereof will be described. In some embodiments, one or more of the computing device 102 or the user device 116 described above with reference to FIGS. 1-7 can be configured as and/or can have an architecture similar or identical to the mobile device 800 described herein in FIG. 8. It should be understood, however, that the computing device 102 and/or the user device 116 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements for configuring the location sharing application 108, the location sharing service 110, and/or the application programs 118; for viewing content associated with a conference and/or other session; for presenting text, images, video, virtual keypads and/or keyboards, messaging data, notification messages, metadata, internet content, device status, time, date, calendar data, device preferences, map and location data; combinations thereof; and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the location sharing application 108, the location sharing service 110, the application programs 118, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, configuring settings and/or options associated with the location sharing service 110, viewing content associated with a conference or other session, joining a conference or other session, viewing content associated with a location, interacting with other applications 810, and otherwise facilitating user interaction with the operating system 808, the applications 810, and/or other types or instances of data 812 that can be stored at the mobile device 800. The data 812 can include, for example, the presentation data 114, the shared location stream 120, the location information 124, the status 122, and/or other data including other applications and/or program modules.

According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the presentation data 114, the shared location stream 120, the location information 124, the status 122, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system ("image system") 832. The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

While the above description provides various examples of the concepts and technologies described herein used with respect to a live conference or other session during which a presenter (e.g., a user of the computing device 102) shares information with a participant (e.g., a user of the user device 116), it should be understood that the concepts and technologies described herein can be used to support non-live (e.g., delayed, recorded, etc.) conferences or sessions. Thus, for example, a presenter can "present" to a recording device, an agent (e.g., artificial intelligence software agents, bots, or the like), or other device or entity and accessed locations can be stored by the agent, recording device, or the like. When a participant (or viewer) later accesses or views the recorded or delayed presentation, the location information can be made available in a manner that is substantially similar to the methods illustrated and described herein with respect to FIGS. 2-4. As such, the various embodiments illustrated and described herein should be understood as illustrative of the concepts and technologies described herein and should not be construed as being limiting in any way.

Based on the foregoing, it should be appreciated that systems and methods for providing and/or interacting with a location sharing service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
identifying, at a server computer that executes a location sharing service and a conferencing application, a presenter for a location sharing session and a participant in the location sharing session, wherein the presenter corresponds to a first entity that shares location information, and wherein the participant corresponds to a second entity that receives the location information;
receiving, at the server computer and during a conference comprising the location sharing session, the location information from a computing device that is associated with the presenter, wherein the location information identifies a location accessed by the computing device during the conference, and wherein the location information comprises data that identifies the location accessed by the computing device during the conference;
providing, by the server computer and during the conference and during the location sharing session, the location information to a user device that is associated with the participant, wherein the user device presents a conference view display, and wherein the user device presents a prompt in response to receiving the location information, wherein the prompt comprises a first option to access the location with the user device and a second option to store the location information in a log; and
transmitting, by the server computer and to the computing device, a status that comprises first information that indicates whether or not the location was received by the user device and second information that indicates whether or not the location associated with the location information was accessed by the user device, wherein the status is transmitted for presentation of a user interface at the computing device, the user interface comprising
a first total number of instances of location information that have been shared with conference participants during the conference,
a second total number of instances of location information that have been received by the conference participants during the conference, and
a third total number of locations that have been accessed by the conference participants during the conference.

2. The method of claim 1, further comprising:
receiving the status from the user device, the status comprising the first information and the second information.

3. The method of claim 2, wherein the user interface comprises
a first indication that indicates whether or not the user device received the location information; and
a second indication that indicates whether or not the user device accessed the location.

4. The method of claim 1, wherein the location comprises a web page, and wherein the computing device provides, to the server computer, the location information as an address of the web page.

5. The method of claim 1, wherein the location comprises a file, and wherein the computing device provides, to the server computer, the location information as an address of a file location at which the computing device accessed the file.

6. The method of claim 1, wherein the prompt comprises a third option to ignore the location information.

7. The method of claim 1, wherein the location information is extracted from a location stream.

8. The method of claim 1, wherein the location information is provided as an address.

9. The method of claim 1, wherein the location information is provided as a data packet.

10. A system comprising:
a processor; and
a memory that stores computer-executable instructions that, when executed by the processor, cause the processor to perform operations comprising
identifying a presenter for a location sharing session and a participant in the location sharing session, wherein the presenter corresponds to a first entity that shares location information, and wherein the participant corresponds to a second entity that receives the location information,
receiving, during a conference comprising the location sharing session, the location information from a computing device that is associated with the presenter, wherein the location information identifies a location accessed by the computing device during the conference, and wherein the location information comprises data that identifies the location accessed by the computing device during the conference,
providing the location information to a user device associated with the participant during the conference and during the location sharing session, wherein the user device presents a conference view display, and wherein the user device presents a prompt in response to receiving the location information, wherein the prompt comprises a first option to access the location with the user device and a second option to store the location information in a log, and
transmitting, to the computing device, a status that comprises first information that indicates whether or not the location was received by the user device and second information that indicates whether or not the location associated with the location information was accessed by the user device, wherein the status is transmitted for presentation of a user interface at the computing device, the user interface comprising
a first total number of instances of location information that have been shared with conference participants during the conference,
a second total number of instances of location information that have been received by the conference participants during the conference, and
a third total number of locations that have been accessed by the conference participants during the conference.

11. The system of claim 10, wherein the computer-executable instructions, when executed by the processor, cause the processor to perform operations further comprising:
receiving the status from the user device, the status comprising the first information and the second information.

12. The system of claim 11, wherein the computing device displays a location sharing service options display that comprises a first user interface control that is selectable to cause the computing device to stream location information relating to accessed locations to the participant, a second user interface control that is selectable to cause the computing device to provide the user interface, and a third user interface control that is selectable to cause the computing device to store a log of location information relating to accessed locations.

13. The system of claim 11, wherein the prompt further comprises:
   a third option to ignore the location information that was shared.

14. A computer storage medium having computer-executable instructions stored thereon that, when executed by a processor, cause the processor to perform operations comprising:
   identifying a presenter for a location sharing session and a participant in the location sharing session, wherein the presenter corresponds to a first entity that shares location information, and wherein the participant corresponds to a second entity that receives the location information;
   receiving, during a conference comprising the location sharing session, the location information from a computing device that is associated with the presenter, wherein the location information identifies a location accessed by the computing device during the conference, and wherein the location information comprises data that identifies the location accessed by the computing device during the conference;
   providing the location information to a user device associated with the participant during the conference and during the location sharing session, wherein the user device presents a conference view display, and wherein the user device presents a prompt in response to receiving the location information, wherein the prompt comprises a first option to access the location with the user device and a second option to store the location information in a log; and
   transmitting, to the computing device, a status that comprises first information that indicates whether or not the location was received by the user device and second information that indicates whether or not the location associated with the location information was accessed by the user device, wherein the status is transmitted for presentation of a user interface at the computing device, the user interface comprising
      a first total number of instances of location information that have been shared with conference participants during the conference,
      a second total number of instances of location information that have been received by the conference participants during the conference, and
      a third total number of locations that have been accessed by the conference participants during the conference.

15. The computer storage medium of claim 14, wherein the computer-executable instructions, when executed by the processor, cause the processor to perform operations further comprising:
   receiving the status from the user device, the status comprising the first information and the second information.

16. The computer storage medium of claim 14, wherein the prompt comprises a third option to ignore the location information.

* * * * *